United States Patent
Goutam et al.

(10) Patent No.: US 11,722,900 B2
(45) Date of Patent: Aug. 8, 2023

(54) MOBILE DEVICE DATA SECURITY USING SHARED SECURITY VALUES

(71) Applicant: Visa International Service Association, San Francisco, CA (US)

(72) Inventors: Digvijay Goutam, Indore (IN); Rohit Sehgal, Haridwar (IN)

(73) Assignee: Visa International Service Association, San Francisco, CA (US)

( * ) Notice: Subject to any disclaimer, the term of this patent is extended or adjusted under 35 U.S.C. 154(b) by 144 days.

(21) Appl. No.: 17/463,409

(22) Filed: Aug. 31, 2021

(65) Prior Publication Data
US 2023/0069097 A1 Mar. 2, 2023

(51) Int. Cl.
*H04W 12/30* (2021.01)
*H04W 12/122* (2021.01)
*G06F 21/52* (2013.01)

(52) U.S. Cl.
CPC ............ *H04W 12/30* (2021.01); *G06F 21/52* (2013.01); *H04W 12/122* (2021.01); *G06F 2221/033* (2013.01)

(58) Field of Classification Search
CPC ..... H04W 12/30; H04W 12/122; G06F 21/52; G06F 2221/033
USPC .......................................................... 726/23
See application file for complete search history.

(56) References Cited

U.S. PATENT DOCUMENTS

| | | | | |
|---|---|---|---|---|
| 9,477,483 B2* | 10/2016 | Longhenry | ........ | G06Q 30/0246 |
| 10,757,089 B1* | 8/2020 | Hohler | ................ | H04L 63/0807 |
| 10,944,742 B2* | 3/2021 | Mumma | ................. | G06F 21/41 |
| 11,563,580 B2* | 1/2023 | Sugarev | ................ | H04L 9/3247 |
| 11,587,062 B1* | 2/2023 | Kurani | .................... | G06Q 20/20 |
| 2014/0310764 A1 | 10/2014 | Tippett et al. | | |
| 2015/0356560 A1 | 12/2015 | Shastry et al. | | |
| 2016/0277374 A1* | 9/2016 | Reid | ................... | H04L 63/0435 |
| 2018/0137272 A1* | 5/2018 | Kamal | .................... | H04W 4/80 |
| 2019/0354664 A1 | 11/2019 | Ranadive et al. | | |
| 2020/0228534 A1* | 7/2020 | Chen | ........................ | G06F 8/70 |
| 2021/0203668 A1* | 7/2021 | Butler | ................... | G06F 21/577 |

FOREIGN PATENT DOCUMENTS

| | | | | |
|---|---|---|---|---|
| CN | 113498515 B | * 10/2022 | ............. | G06F 21/30 |
| WO | 2019125181 A1 | 6/2019 | | |
| WO | WO-2019125181 A1 | * 6/2019 | ............. | G06F 21/16 |

OTHER PUBLICATIONS

"In-App Payments SDK: How it Works", https://developer.squareup.com/docs/in-app-payments-sdk/how-it-works, 2020, 3 pages.
PCT/US2022/040802, "International Search Report and the Written Opinion", dated Dec. 6, 2022, 8 pages.

* cited by examiner

*Primary Examiner* — Michael W Chao
*Assistant Examiner* — Peiliang Pan
(74) *Attorney, Agent, or Firm* — Kilpatrick Townsend & Stockton LLP

(57) ABSTRACT

A method is disclosed. The method includes providing, by an SDK and a first application in a mobile device, first and second security values to a security value verification module in the mobile device. If the mobile device confirms that the first and second security values match, then a second application can proceed with interaction processing.

20 Claims, 3 Drawing Sheets

MOBILE DEVICE DATA SECURITY USING SHARED SECURITY VALUES

CROSS-REFERENCES TO RELATED APPLICATIONS

None

BACKGROUND

As more interactions are performed by mobile devices such as mobile phones, fraudsters look for opportunities to exploit such interactions. They can do this by sending fake SMS or e-mail messages that contain malicious links to a mobile device. Once a user clicks on the link, a malicious file such as a malicious APK (Android Application Package) file can be downloaded to the mobile device. The downloaded malicious file (or application) can be provided with unauthorized read/write access to all the applications installed in mobile device. In some cases, a malicious file, application, or actor can read a legitimate OTP (one time password) intended for another application and can use it to conduct a fraudulent transaction such as a fraudulent payment transaction. The potential losses that may result from such fraudulent activity can be significant.

Embodiments of the invention address these and other problems, individually and collectively.

BRIEF SUMMARY

Embodiments of the invention include mobile devices and methods that can provide greater security against attacks by malicious applications or files on mobile devices.

One embodiment of the invention includes a method performed by a mobile device comprising a processor, and a memory coupled to the processor, the memory storing a first application, a second application including a security value verification module, a software development kit (SDK), and one or more security value generation modules, the method comprising: generating, by the one or more security value generation modules, a first security value and a second security value; providing, by the one more security value generation modules, the first security value to the first application and the second security value to the SDK; receiving, by the first application, a request for an interaction; responsive to receiving the request for the interaction, providing, by the first application to the security value verification module, the first security value; receiving by the SDK from the first application, an indication that the request for the interaction was received by the first application; responsive to receiving the indication by the SDK from the first application, providing, by the SDK to the security value verification module, the second security value; comparing, by the security value verification module, the first security value from the first application and the second security value from SDK to determine if the first and second security values match; and processing, by the second application, the interaction if the security values from the first application and the SDK match.

Another embodiment of the invention includes a mobile device comprising: a processor; and a memory coupled to the processor, the memory storing a first application, a second application including a security value verification module, a software development kit (SDK), and a security value generation module, the memory comprising code, executable by the processor for implementing operations comprising: generating, using one or more security value generation modules, a first security value and a second security value; providing, by the one more security value generation modules, the first security value to the first application and the second security value to the SDK; receiving, by the first application, a request for an interaction; responsive to receiving the request for the interaction, providing, by the first application to the security value verification module, the first security value; receiving by the SDK from the first application, an indication that the request for the interaction was received by the first application; responsive to receiving the indication by the SDK from the first application, providing, by the SDK to the security value verification module, the second security value; comparing, by the security value verification module, the first security value from the first application and the second security value from SDK to determine if the first and second security values match; and processing, by the second application, the interaction if the security values from the first application and the SDK match.

These and other embodiments are described in further detail below.

DETAILED DESCRIPTION

Figure 1:
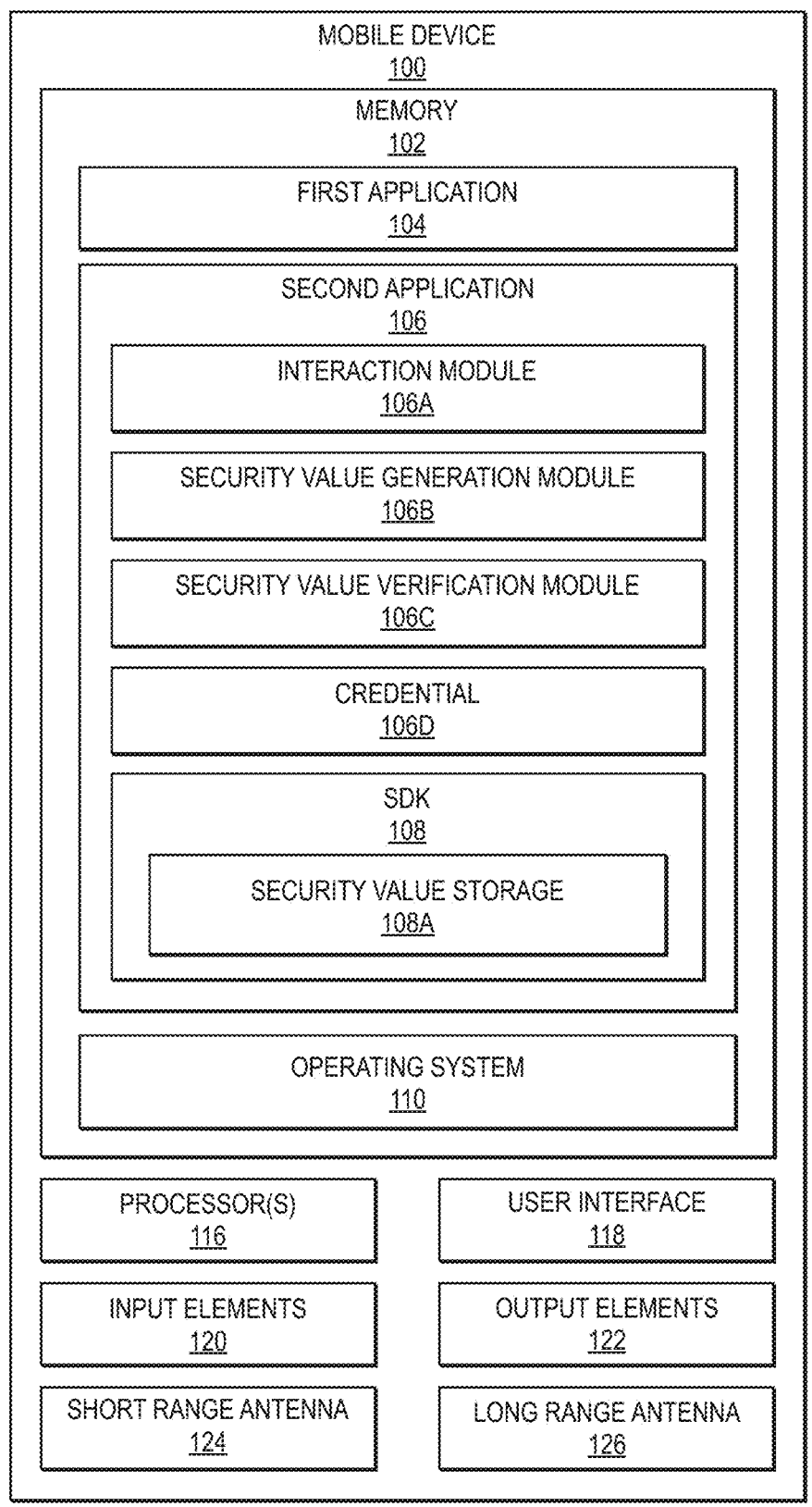
FIG. 1 is a block diagram illustrating an exemplary mobile device according to an embodiment of the invention.

Prior to discussing specific embodiments of the invention, some terms may be described in detail.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

A "security value" can include a value that provides security for an interaction. In some embodiments, the security value can be a value that can be calculated based upon information known to both a first application and an SDK. In some embodiments, a security value can be a nonce.

Embodiments of the invention can relate to the authentication of a legitimate interaction using shared security values such as shared nonces. A first application, and a software development kit (SDK) embedded in a second application or separate from the second application, can provide security values to a security value verification module. If the security values match, then the interaction is legitimate, and interaction processing can continue.

A malicious application or file would not have the ability to cause the SDK to provide a security value. In this case, the security value verification module would not be able to verify the interaction and the interaction would not proceed.

FIG. 1 is a block diagram showing a mobile device 100 according to an embodiment. The mobile device 100 can include a memory 102, one or more processors 116, a short range antenna 124, a long range antenna 126, input elements 120, a user interface 118, and output elements 122. Examples of input elements may include microphones, keypads, touchscreens, sensors, etc. Examples of output elements may include speakers, display screens, and tactile devices. The processor 116 can be implemented as one or more integrated circuits (e.g., one or more single core or multicore microprocessors and/or microcontrollers), and is used to control the operation of mobile device 100. The processor 116 can execute a variety of programs in response to program code or computer-readable code stored in the system memory 102, and can maintain multiple concurrently executing programs or processes.

The user interface 118 can include any combination of input and output elements to allow a user to interact with and invoke the functionalities of mobile device 100. The short range antenna 124 may be configured to communicate with external entities through a short range communication medium (e.g. using Bluetooth, Wi-Fi, infrared, NFC, etc.). The long range antenna 126 may be configured to communicate with a remote base station and a remote cellular or data network, over the air. The long range antenna 126 may include one or more RF transceivers and/or connectors that can be used by mobile device 100 to communicate with other devices and/or to connect with external networks.

The system memory 102 can be implemented using any combination of any number of non-volatile memories (e.g., flash memory) and volatile memories (e.g. DRAM, SRAM), or any other non-transitory storage medium, or a combination thereof media.

The system memory 102 may also store at least a first application 104, a second application 106, and an operating system 110. In some embodiments, the first application 104 may be a resource provider application such as a ride sharing application, a transit application, a banking application, a streaming service application, a social media application, a merchant application, etc. In some embodiments, the second application may provide credentials that can be used to complete interactions conducted with the first application 104. For example, the second application 106 may be a digital wallet, a payment application etc.

The second application 106 can include a number of software modules and/or data elements including an interaction module 106A, a security value generation module 106B, a security value verification module 106C, one or more credentials 106D, and an SDK 108 which may have an ability to temporarily store a security value.

The interaction module 106A and the one or more processors 116 can generate a request for an interaction. In some embodiments, the request may be formatted in a particular manner by the interaction module 106A and could include the credential 106D. The credential could be sensitive data such as a user ID, a primary account number, a payment token, a biometric template, etc. The request may be sent to an external entity such as an authorizing entity computer (e.g., an issuer) to authorize an interaction. In other embodiments, the interaction module 106A and the one or more processors 116 can retrieve the credential 106D and can provide it to the first application 104.

The security value generation module 106B and the one or more processor(s) 116 can generate one or more security values. In some embodiments, the security value generation module 106B can include a random number generator, which can generate random nonces. The security value generation module 106B and the one or more processor(s) 116 can generate security values periodically (e.g., after every interaction involving the second application 106, every week, etc.) and can provide first and second security values to the first application 104 and the SDK 108, respectively. The first and second security values can be the same, and they can be the same nonce in some embodiment.

In some embodiments, the security value generation module 106B can include an algorithm which can use information known to the first application 104 and the SDK 108 to generate the security value. For instance, information such as a mobile device identifier (e.g., a phone number), an address of the user of the mobile device 100, etc., and some dynamic input value (e.g., a counter, date, time, etc.) can be used to generate a security value. Such data may be converted to numerical form, concatenated, optionally truncated, and processed in some manner (e.g., hashed, encrypted, etc.).

As shown in FIG. 1, the security value generation module 106B can be in the second application 106, but outside of the SDK 108, and can provide security values to the first application 104 and the SDK 108. In other embodiments, the security value generation module 106B could be in the SDK 108. In still other embodiments, each of the first application 104 and the SDK 108 could have a security value generation module (e.g., a first security value generation module and a second security value generation module). In such embodiments, the first application 104 and the SDK 108 could generate security values independently based upon the same data (e.g., by using the date, a device ID, and user information as inputs to an algorithm).

The security value verification module 106C and the one or more processor(s) 116 can verify that security values from the first application 104 and the SDK match. The security value verification module 106C and the one or more processors 116 can also invoke the interaction module 106A (in conjunction with the one or more processors 116) to take some action (e.g., as described above) based upon the security value verification process.

The SDK 108 can include a security value storage 108A for temporarily storing a security value received from the security value generation module 106B. The SDK 108 can interact with the first application 104 or the second application 106 (if the SDK 108 is external to the second application 106) via one or more APIs. In some embodiments, the SDK 108 can include the security value generation module 106B and can generate the security value and can pass it to the first application via the one or more APIs prior to any interaction that is initiated by the first application.

The memory 102 may also comprise code, executable by the processor for implementing operations comprising: generating, using one or more security value generation modules, a first security value and a second security value; providing, by the one more security value generation modules, a first security value to the first application and a second security value to the SDK; receiving, by the first application, a request for an interaction; responsive to receiving the request for the interaction, providing, by the first application to the security value verification module, the first security value; receiving by the SDK from the first application, an indication that the request for the interaction was received by the first application; responsive to receiving the indication by the SDK from the first application, providing, by the SDK to the security value verification module, the second security value; comparing, by the security value verification module, the first security value from the first application and the second security value from SDK to determine if the first and second security values match; and processing, by the second application, the interaction if the security values from the first application and the SDK match.

Figure 2:
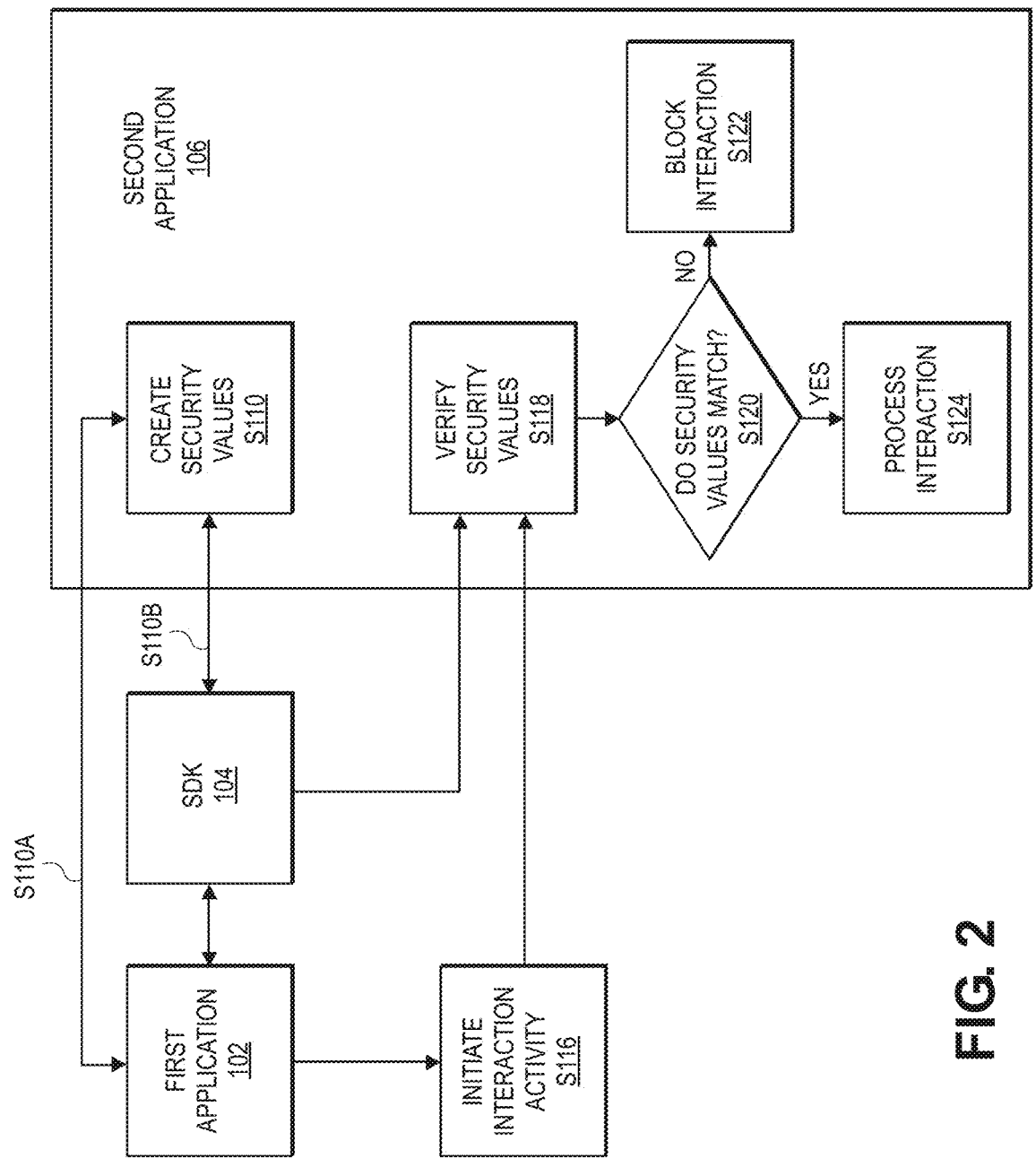
FIG. 2 is a flow diagram illustrating an embodiment of the invention.

A method according to an embodiment can be described with reference to FIG. 2. The method can include generating, by one or more security value generation modules on a mobile device, a first security value and a second security value, and then providing by the one more security value generation modules, a first security value to the first application and a second security value to the SDK. The method also includes receiving, by a first application on the mobile device, a request for an interaction. Then, responsive to receiving the request for the interaction, the first application provides the first security value to the security value verification module. The method also includes receiving by the SDK from the first application, an indication that the request for the interaction was received by the first application, and responsive to receiving the indication by the SDK from the first application, providing, by the SDK to the security value verification module, the second security value. The method also includes comparing, by the security value verification module, the first security value from the first application and the second security value from SDK to determine if the first and second security values match, and processing, by the second application, the interaction if the security values from the first application and the SDK match The diagram in FIG. 2 shows the first application 102, the second application 106, and the SDK 104. The SDK 104 can act as an intermediary between the first application 102 and the second application 106.

In step S110, a security value generation module in the second application 106 can generate a first security value and a second security value. After generating the first security value and the second security value, the security value generation module in the second application can then provide the first security value to the first application 102 in step S110B and can provide the second security value to the SDK 104 in step S110A. The first and second security values can be stored in the first application 102 and the SDK 104 for any suitable period of time, and the security values may be refreshed or re-generated if desired.

In step S116, at some point, the user of the mobile device will initiate some activity with the first application 102. For example, the first application may be a ride sharing application and the user of the mobile device may wish to initiate the process of requesting and/or paying for a ride. The user may authenticate themselves to the first application and may provide the necessary input to the first application 102 to initiate the interaction.

The first application 102 may then attempt to retrieve a credential such as a payment credential from the second application 106, or it may request the second application 106 to generate an authorization request message for the interaction using the credential. In doing so, the first application 102 can provide the previously described first security value to the security value verification module. In response to the request for the interaction, the first application 102 may communicate with the SDK 104 (e.g., via an API) to separately request that it provide the second security value to the security value verification module of the second application.

At step S110, the security value verification module can then compare the first security value from the first application 102 and the second security value from the SDK to see if they match. If they match, then the interaction is processed as requested in step S124. If they do not match, then the interaction is blocked S122 or ceases.

If they match, then the interaction can be further processed. For example, in some embodiments, the credential can be retrieved and provided to the first application. The first application can then process the interaction using the credential. For example, the first application and the one or more processors can generate an authorization request message and can transmit it to an authorizing entity computer for authorization. In some embodiments, the second application could generate an authorization request message with the credential and could cause the mobile device to transmit the authorization request message to an external authorizing entity computer.

Figure 3:
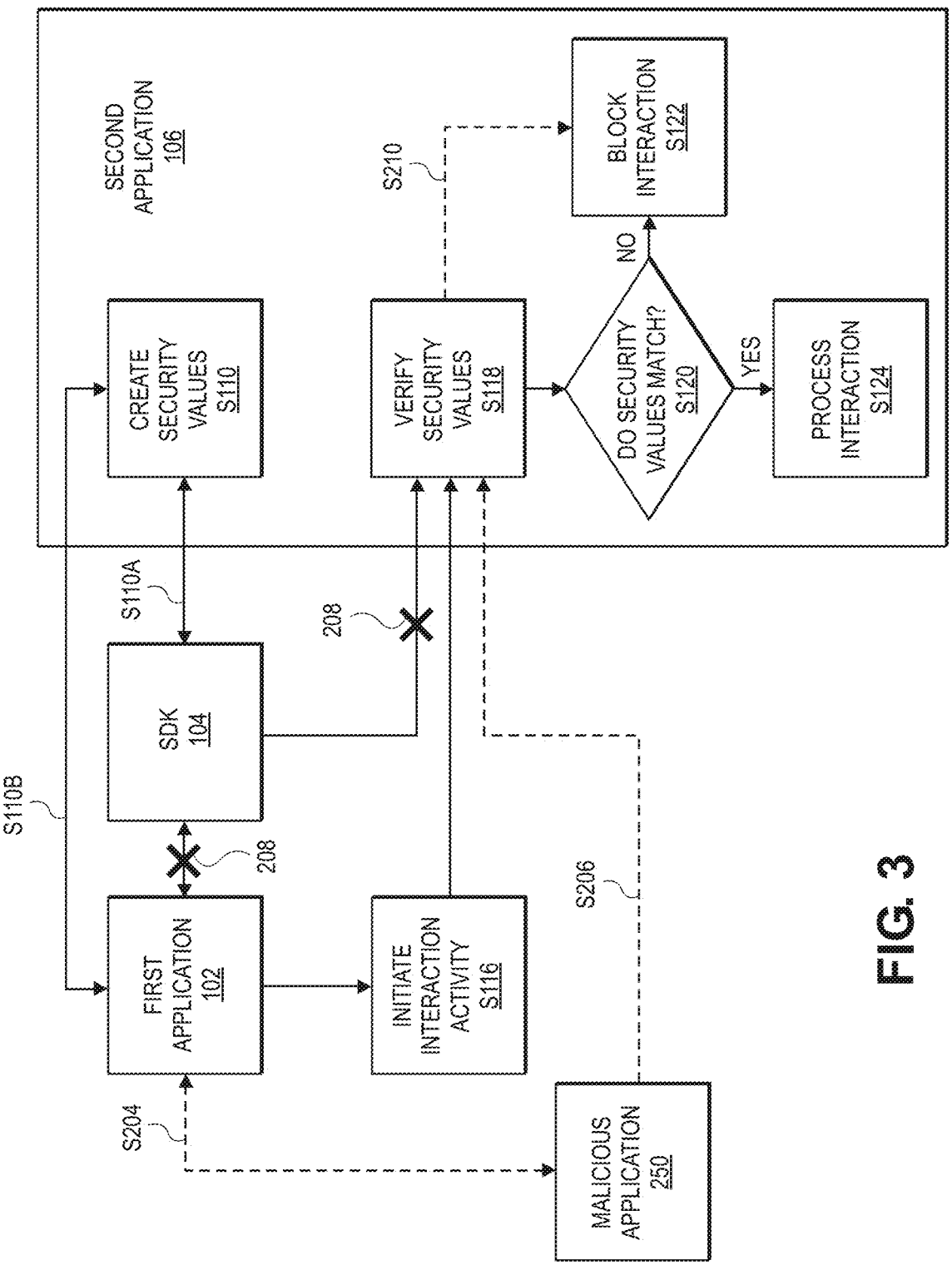
FIG. 3 is a flow diagram illustrating a scenario in which a malicious application attempts to conduct a fraudulent interaction.

FIG. 3 shows a diagram illustrating processing by a malicious application 250 (shown by dotted lines). The malicious application 250 may be on the mobile device and may attempt to obtain information from the first application 102 in step S204. Such information could be the user's home address, telephone number, e-mail address, and other information that it might use to obtain the credential from the second application. Another example of information might a one time password (OTP) that was sent by an external server to the first application 102, where the one time password is needed to access the second application 106. It may also be possible that the malicious application 250 was able to obtain the previously stored first verification value in the first application.

However, since the user of the mobile device did not cause the first application 102 to conduct an interaction, it will not communicate with the SDK 104 and the SDK 140 will not pass the second security value to the security value verification module in the second application 106 as shown by 208. Therefore, when the security value verification module in the mobile device attempts to verify security values, it will only have the first security value obtained from the first application, and corresponding to the attempted interaction by the malicious application. As shown by S210 (or via S120), the interaction will be blocked, since the security value verification module was unable to match security values.

Embodiments of the invention provide for a number of technical advantages. For example, embodiments of the invention can prevent a malicious application from surreptitiously communicating with an application on a mobile device and then using the data from the application to conduct an interaction. Further, any malicious application would not know that a separate SDK within the mobile device needs to provide a separate security value before processing by a second application can continue. As such, even if the malicious application is able to install itself on a mobile device, it will not be able to perform sensitive processing using certain applications on the mobile device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method performed by a mobile device comprising a processor, and a memory coupled to the processor, the memory storing a first application, a second application including a security value verification module, a software development kit (SDK), and one or more security value generation modules, the method comprising:

generating, by the one or more security value generation modules, a first security value and a second security value;

providing, by the one more security value generation modules, the first security value to the first application and the second security value to the SDK;

receiving, by the first application, a request for an interaction;

responsive to receiving the request for the interaction, providing, by the first application to the security value verification module, the first security value;

receiving by the SDK from the first application, an indication that the request for the interaction was received by the first application;

responsive to receiving the indication by the SDK from the first application, providing, by the SDK to the security value verification module, the second security value;

comparing, by the security value verification module, the first security value from the first application and the second security value from the SDK to determine if the first and second security values match; and processing, by the second application, the interaction if the first security value from the first application and the second security value from the SDK match.

2. The method of claim 1, wherein the first security value and the second security value are the same.

3. The method of claim 1, wherein the first security value and the second security value are both a nonce and are the same.

4. The method of claim 1, wherein the mobile device is a mobile phone.

5. The method of claim 1, wherein the SDK is incorporated into the second application.

6. The method of claim 1, wherein the interaction is an access interaction.

7. The method of claim 1, wherein the one or more security value generation modules includes one security value generation module, which is a component of the second application.

8. The method of claim 1, wherein the first application is a resource provider application and the second application is an access application.

9. The method of claim 1, wherein the first security value is generated based upon data known to both the first application and the SDK.

10. The method of claim 1, wherein the SDK is in communication with the first application via one or more APIs.

11. A mobile device comprising:
a processor; and
a memory coupled to the processor, the memory storing a first application, a second application including a security value verification module, a software development kit (SDK), and one or more security value generation modules, the memory comprising code, executable by the processor for implementing operations comprising:
generating, using the one or more security value generation modules, a first security value and a second security value;
providing, by the one more security value generation modules, the first security value to the first application and the second security value to the SDK;

receiving, by the first application, a request for an interaction;

responsive to receiving the request for the interaction, providing, by the first application to the security value verification module, the first security value;

receiving by the SDK from the first application, an indication that the request for the interaction was received by the first application;

responsive to receiving the indication by the SDK from the first application, providing, by the SDK to the security value verification module, the second security value;

comparing, by the security value verification module, the first security value from the first application and the second security value from the SDK to determine if the first and second security values match; and processing, by the second application, the interaction if the first security value from the first application and the second security value from the SDK match.

12. The mobile device of claim 11, wherein the one or more security value generation modules comprises a single security value generation module, the single security value generation module being in the second application.

13. The mobile device of claim 11, wherein the first security value and the second security value are both a nonce and are the same.

14. The mobile device of claim 11, wherein the one or more security value generation modules include a first security value generation module in the first application, and a second security value generation module in the SDK or the second application.

15. The mobile device of claim 11, wherein the SDK is incorporated into the second application.

16. The mobile device of claim 11, wherein processing the interaction comprises retrieving a credential and providing the credential to the first application.

17. The mobile device of claim 11, wherein the one or more security value generation modules is one security value generation module, which is a component of the second application.

18. The mobile device of claim 11, wherein the first application is a resource provider application and the second application is an access application.

19. The mobile device of claim 11, wherein the mobile device is a mobile phone.

20. The mobile device of claim 11, wherein the SDK is in communication with the first application via one or more APIs.

* * * * *